J. O'CONNOR.
WAGON-HOUND.

No. 176,040. Patented April 11, 1876.

Witnesses  Inventor
  James O'Connor
  By Connolly Bro.
  Attorneys

UNITED STATES PATENT OFFICE.

JAMES O'CONNOR, OF JACKSON, MISSOURI, ASSIGNOR OF ONE-HALF HIS RIGHT TO LOWNDES H. DAVIS, OF SAME PLACE.

IMPROVEMENT IN WAGON-HOUNDS.

Specification forming part of Letters Patent No. 176,040, dated April 11, 1876; application filed February 1, 1876.

*To all whom it may concern:*

Be it known that I, JAMES O'CONNOR, of Jackson, in the county of Cape Girardeau and State of Missouri, have invented certain new and useful Improvements in Wagon-Hounds; and I do hereby declare the following to be a full, clear, and exact description of the invention, such as will enable others skilled in the art to which it pertains to make and use it, reference being had to the accompanying drawings, which form part of this specification, in which—

Figure 1:
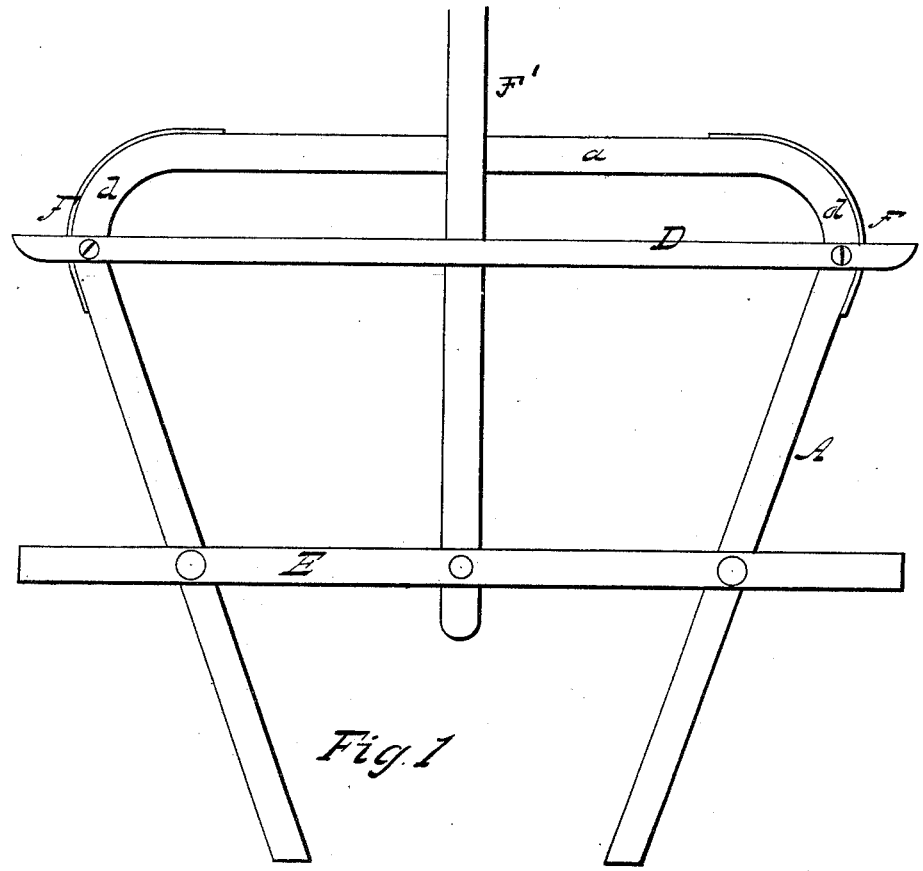
Figure 2:
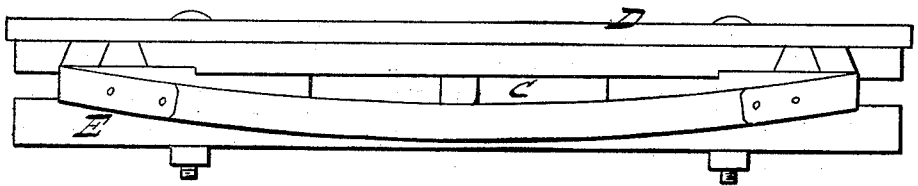

Figure 1 is a top view, and Fig. 2 is a back view.

This invention has relation to the front hounds of a wagon; and consists, essentially, in bending downward the transverse bar, usually termed the "bottom slider," so as to leave space for the coupling-pole between the top and bottom sliders, and thereby allow the gearing to occupy a level position without imposing any strain upon the coupling-pole.

Referring to the accompanying drawings, A designates my improved hound, made, preferably, of a single bar of wood, bent so as to produce the transverse bar or bottom slider $a$, and further bent, so that the latter shall curve downwardly or depend, and leave a space, C, between its upper surface and the lower surface of the top slider D. This bend, curve, or dependence may begin either behind, directly at, or slightly forward of the angles $d$. E designates the axle, and F' the coupling-pole, of the usual construction. F F are plates of metal secured upon the angles $d$ to strengthen the hound at these points.

What I claim as new, and desire to secure by Letters Patent, is—

1. The forward hounds of a wagon, made of a single bar of wood, with its rear portion or transverse bar bent or curved downwardly, substantially as shown and described.

2. The combination of the forward wagon-hounds, having the bottom slider bent or curved downwardly, and the top slider, substantially as described.

In testimony that I claim the foregoing I have hereunto set my hand.

JAMES O'CONNOR.

Witnesses:
H. R. ENGLISH,
T. F. WHEELER.